(No Model.)
2 Sheets—Sheet 1.
D. C. WALTER.
FEED WATER REGULATOR.
No. 420,979. Patented Feb. 11, 1890.
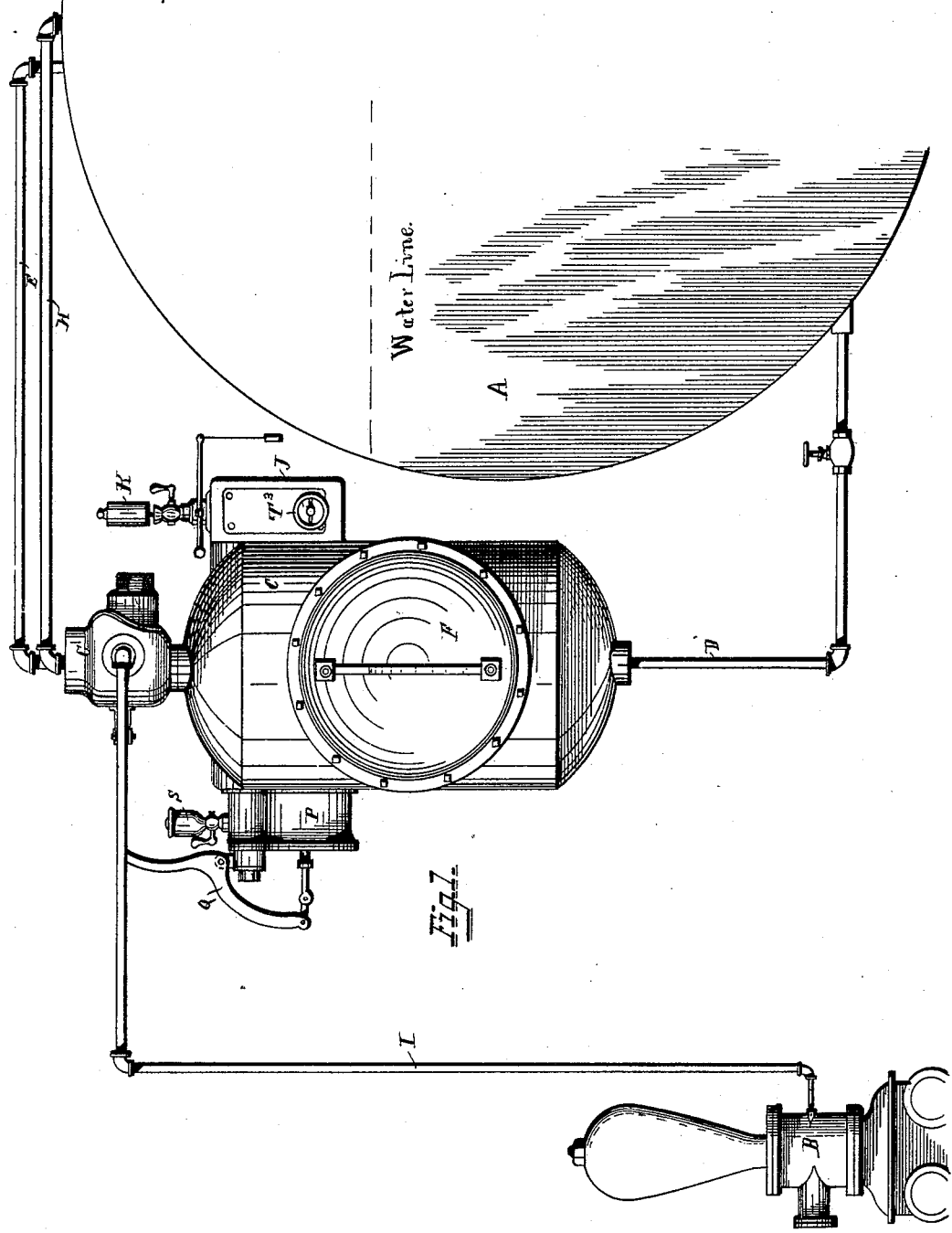

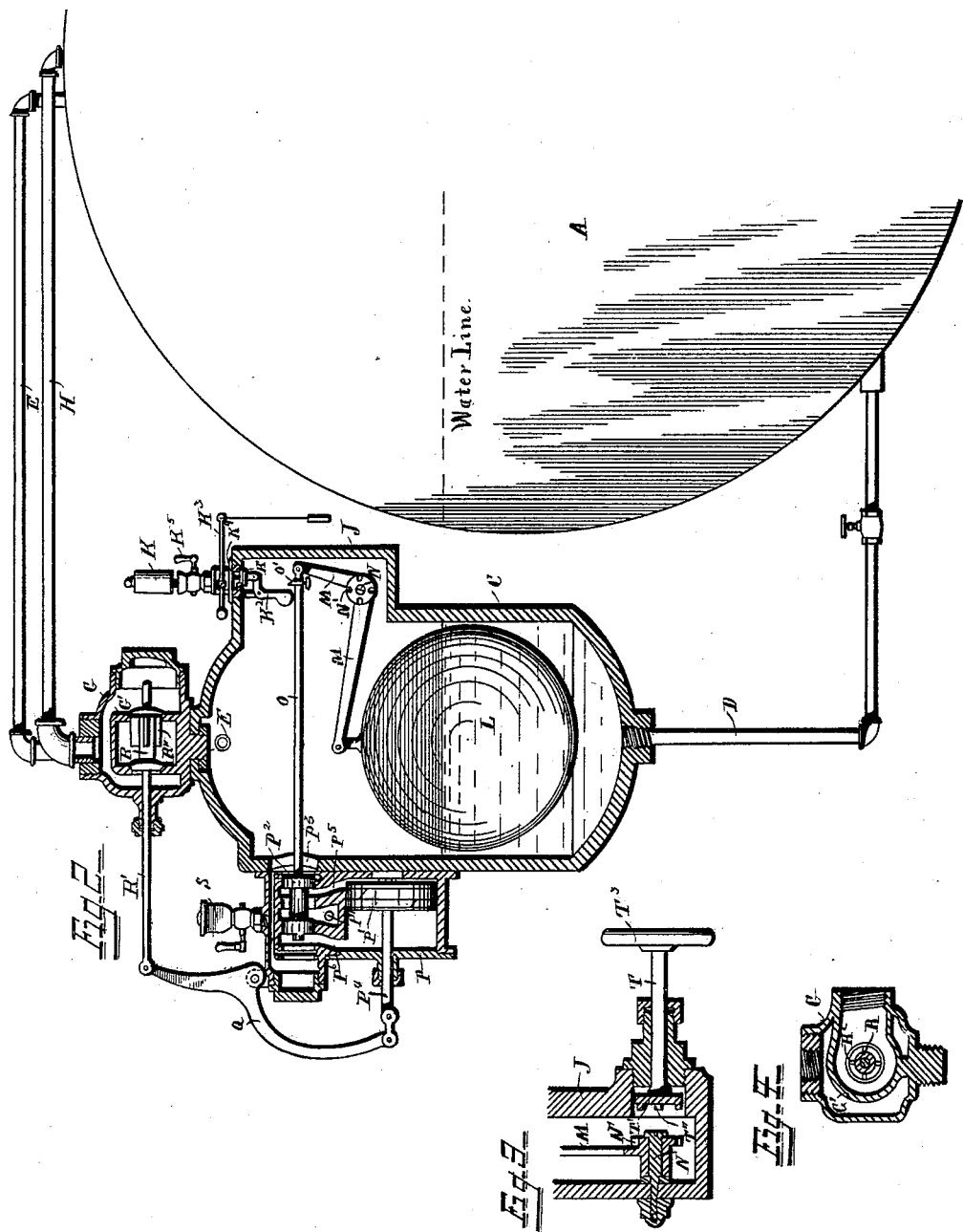

UNITED STATES PATENT OFFICE.

DAVID C. WALTER, OF TOLEDO, OHIO, ASSIGNOR OF TWO-THIRDS TO JAMES C. OTIS AND SAMUEL P. BOWLES, OF SAME PLACE.

FEED-WATER REGULATOR.

SPECIFICATION forming part of Letters Patent No. 420,979, dated February 11, 1890.

Application filed August 23, 1888. Serial No. 283,602. (No model.)

*To all whom it may concern:*

Be it known that I, DAVID C. WALTER, a citizen of the United States, residing at Toledo, in the county of Lucas and State of Ohio, have invented certain new and useful Improvements in Feed-Water Regulators; and I do hereby declare that the following is a full, clear, and exact description of the invention, which will enable others skilled in the art to which it appertains to make and use the same, reference being had to the accompanying drawings, and to the letters of reference marked thereon, which form part of this specification.
My invention relates to appliances for regulating the supply of feed-water to steam-boilers in order to maintain the water at its proper level, and thus not only avoid the dangers resulting from low water, but also insure the required pressure of steam for working purposes.

The objects of my invention are, first, to provide a regulator which shall promptly and automatically give steam to the feed-pump at the moment when more water is needed, and which shall also promptly and automatically shut off steam from the feed-pump as soon as the required amount of water has been forced into the boiler; secondly, to provide attachments whereby the regulator shall automatically sound an alarm when from any cause the level of water falls below the safety-point; thirdly, to provide attachments whereby the low-water alarm shall be adapted to be sounded for general signal purposes, and, finally, to provide attachments for loosening up the working parts of the regulator when the same are to be lubricated or oiled.

To the above purposes my invention consists, first, in the provision of a valve for admitting or cutting off steam for the feed-pump, said valve being connected operatively with the steam-piston, and the valve of said piston being thrown by a float in such manner that when the water in the boiler falls below a certain level the steam-piston shall be automatically moved, so as to open the valve to the feed-pump, thus starting the latter to work, and in such manner, also, that when the water-level rises in the boiler to the required point the steam-valve shall be automatically closed and the pump stopped; secondly, in the provision of a stop operated automatically by the fall of the float and serving to automatically open the valve of an alarm-whistle and thus sound an alarm before a dangerously-low fall of water-level in the boiler occurs; thirdly, in a novel form of attachment for opening the valve in the alarm-whistle by hand when the whistle is to be used for general signaling purposes; fourthly, in a novel form of attachment for varying the position of certain parts of the regulator when the same is being lubricated; and my invention consists, finally, in certain peculiar and novel features of general construction, and in certain peculiar and novel parts and combinations of parts, all as hereinafter described and claimed.

In order that my invention may be fully understood, I will proceed to describe it with reference to the accompanying drawings, in which—

Figure 1 is a view of the end portion of a boiler and a similar view of a feed-pump and a front view of my improved feed-water regulator in operative position relative to the same. Fig. 2 is a transverse vertical section of the regulator in operative position relative to the boiler. Fig. 3 is a transverse vertical section on the line indicated at 3 3 in Fig. 2, showing the attachment for varying certain of the parts of the regulator while lubricating the same. Fig. 4 is a transverse vertical section of the casing and valve for the feed-pump on the line indicated at 4 4 in Fig. 1, and showing more clearly the construction of the valve and its casing.

In the said drawings, A designates the shell of a steam-boiler, which may be either of the horizontal type shown or of the vertical style, as desired, and B designates the feed-pump of the usual or any preferred form suitable for supplying water to the boiler as needed.

C designates the main casing or float-chamber of my improved regulator, said chamber being preferably of the elongated cylindrical form shown or of any other shape suitable for containing the operating devices hereinafter described. The bottom of casing C is connected by a suitable pipe D with the water-space within the boiler, said casing being set vertically in such relation to the boiler that the normal water-level in the regulator shall be about midway of the lower part of casing C, as indicated in Figs. 1 and 2. The upper part of this casing or chamber C is connected by a pipe E with the steam-space within the boiler, so that there is within the main chamber of the regulator the same relative proportions of steam and water as there is within the boiler itself.

At one side of the casing C is bolted a removable plate F, which thus permits access to the interior of the chamber when it is desired to adjust or repair any of the working parts therein. This plate may be either of circular form, as shown in Fig. 1, or of any other suitable or preferred form, and upon said plate is mounted a water-gage for indicating the height of water-level within the chamber C.

Upon the top of the main casing C is bolted or otherwise secured the casing or chamber G of a valve R, for admitting or shutting off steam for the feed-pump B, said chamber G being connected at its top by a pipe H with the steam-space of the boiler and at its side by a pipe I with the feed-pump. The construction and arrangement of the valve within the chamber G will be fully described hereinafter.

At the upper right-hand side of the main chamber C is formed an offset J, and to the top of this offset is attached a whistle K, as hereinafter more particularly explained.

L designates a float, which is located in the lower part of casing C, and the upper side of which is pivotally connected to the lower end of an L-shaped arm or lever M, as shown, said lever being pivoted at N within the offset J. The upper end of lever M is pivotally connected to one end of the rod O, which extends horizontally across the upper part of the chamber C and which constitutes the prolonged stem of valve P'', to be hereinafter described.

Upon the upper part of casing C and opposite to the offset J is secured a casing P, within the lower part of which is placed a piston P', and the upper part of which constitutes a chamber or chest for a valve P'', this latter chamber communicating by a port P''' with the interior of the casing C. The rod O, before referred to, extends through the port P''', and its outer end is connected to the inner end of the valve P'', so that said rod constitutes the prolonged stem of the valve, as before stated. Upon the outer edge of the top of casing P is pivoted a lever Q, the upper arm of which is connected at its upper extremity to the stem R' of the valve R within casing G, and the lower curved arm of said lever is connected at its lower extremity to the rod P'''' of the piston P', before referred to.

P''''' P'''''' designate the ports, which lead from the chest of valve P'' to the inner and outer ends of the piston-chamber in casing P, and P''''''' designates an exhaust-port for discharging steam from said casing after such steam has performed its required work.

Within the casing or chamber G is formed an internal frame G', which constitutes the seat for the valve R, and the latter is formed with offsets R'', which serve as guides for insuring the proper movements of the valve in its seat. Steam from the boiler passes through the pipe H and remains in the space surrounding the valve-seat G'. Thus valve R is at all times in direct contact with steam, for a purpose to be presently explained.

From the above description it will be seen that when the water-level lowers the float L falls and rocks the arm or lever M, thus moving valve-stem O and valve P'' to the left, and admitting steam through port P''''' to the inner side of piston P'. The piston P' is thus thrown outward or to the left, and this movement, acting on the lever Q, throws the upper end of said lever to the right and moves the valve R upon its seat, so as to admit steam into the space within the seat and thence out through pipe I to the feed-pump B. As the pump works, the water-level in the boiler and also in the float-chamber C rises, thus lifting the float, and by reverse movements of the lever M and stem O draws the valve P'' back to its normal position, admitting steam through port $P^6$, and thus allowing the piston P' to return to its original position, closing valve R through reverse movement of connections Q R' and cutting off pump B. Thus it will be seen that the action of the feed-pump is quickly and automatically controlled by the regulator, and that the water-level will be automatically maintained at a proper height in the boiler.

The whistle K communicates, through a port in the upper part of offset J, with the interior of the float-chamber C. An upwardly-closing valve K' covers the port, and the stem of said valve is pivotally connected to the upper end of an inverted-L shaped lever K'', which is hung pivotally in the upper part of offset J. The lower end of the pendent arm of lever K'' engages at times with a stop O' on stem O. The stop O' is adjustable on stem O, and is held in required position thereon by a set-screw or similar attachment. The stop is so adjusted that before the water-level falls below the safety-point the movement of stem O causes stop O' to strike lever K'', thus opening valve K' and blowing the whistle.

An arm K''' is pivoted upon the whistle-pipe and carries within said pipe a downwardly-extending stud K'''', which, when said arm K''' is depressed, opens valve K' and allows the whistle to be blown by hand for ordinary signaling purposes. When the whistle is blown as an alarm-signal for low water, its operation is stopped by the attendant by means of a handle K''''', which is connected with a valve of any suitable form set in the whistle-pipe and arranged to cut off steam from the whistle when the handle K''''' is turned in the proper direction.

S designates a lubricator, of the usual or any preferred form, connected with the top of casing P and communicating by suitable ports with the bearings of valve P''.

The lever M is provided at its pivotal point N with a circular series of recesses N'. These recesses are designed to receive a circular series of lugs T'' upon the inner face of a disk T', which is secured to a stem T, which works through a stuffing-box screwed into the lower part of offset J. A hand-wheel T''' is attached to the outer end of stem T, and the arrangement is such that by pushing inward the stem T the studs T'' are caused to enter recesses N'. Now, by working the stem T the lever M and valve P'' will be oscillated and the lubricating-oil will be thoroughly worked into the bearings of the valve, so as to insure the proper operation of the parts. By releasing the stem T its disk T' will be thrown back to its normal position by the steam-pressure, and thus disengage the studs T'' from the lever M.

From the above description it will be seen that the regulator is adapted to act as a low-water alarm, and also that the parts may be thoroughly lubricated, so as to insure the proper operation of the working parts.

It is to be particularly understood that my invention is not restricted to the precise construction and arrangement of parts above described, but that various modifications may be made in such particulars without departing from the spirit of my invention.

Having thus described my invention, what I claim as new therein, and desire to secure by Letters Patent, is—

1. In a feed-water regulator, the combination, with a water-chamber connected with the water and steam space of the boiler, of a float carried within the chamber and connected with a steam-valve located within a receptacle communicating with the water-chamber by means of an elbow-lever and rod, said lever and rod being entirely within the water-chamber, a steam-chest carried upon the water-chamber and entirely independent of the same, pipes connecting said steam-chest with the steam-space of the boiler and the supply-pump, a valve for controlling the passage of steam through the steam-chest, a piston and connecting-levers for operating said valve, said piston being operated by the steam-valve connected with the float, substantially as shown and described.

2. In a feed-water regulator, the combination, with a water-chamber and a float working therein, of an alarm-whistle attached to said chamber, an upwardly-closing valve whose stem is pivoted to the inner side of the water-chamber, and an elbow-lever connected to the float, its free end being adapted to strike the depending portion of the valve-stem, substantially as and for the purpose described.

3. In a feed-water regulator, the combination, with a boiler, supply-pump, and water-chamber, of a steam-chest attached to the water-chamber, pipes connecting said chest with the boiler and steam-pump, and a valve for controlling the admission and discharge of steam, operated substantially as shown and described.

4. In a feed-water regulator, a valve for operating the inlet-valve to the feed-pump, a float operatively connected to the valve, a lubricator, and an attachment for changing the positions of the working parts while lubricating the same, substantially as described.

In testimony that I claim the foregoing as my own I hereby affix my signature in presence of two witnesses.

DAVID C. WALTER.

Witnesses:
WILLIAM WEBSTER,
JNO. L. CONDRON.